US006826546B1

(12) United States Patent
Shuster

(10) Patent No.: US 6,826,546 B1
(45) Date of Patent: Nov. 30, 2004

(54) METHOD AND SYSTEM FOR LICENSING A COPY OF A COPYRIGHT PROTECTED WORK

(75) Inventor: Gary Stephen Shuster, Oakland, CA (US)

(73) Assignee: IdeaFlood, Inc., Zephyr Cove, NV (US)

( * ) Notice: Subject to any disclaimer, the term of this patent is extended or adjusted under 35 U.S.C. 154(b) by 595 days.

(21) Appl. No.: 09/696,904

(22) Filed: Oct. 26, 2000

Related U.S. Application Data
(60) Provisional application No. 60/225,886, filed on Aug. 17, 2000.

(51) Int. Cl.[7] ............................................. G06F 17/60
(52) U.S. Cl. .............................. 705/52; 705/56; 705/59; 713/176; 713/181
(58) Field of Search ............................. 705/52, 56, 59; 713/176, 181

(56) References Cited

U.S. PATENT DOCUMENTS

| | | | | | |
|---|---|---|---|---|---|
| 4,658,093 A | * | 4/1987 | Hellman | ....................... | 705/52 |
| 5,375,240 A | * | 12/1994 | Grundy | ....................... | 713/200 |
| 5,455,905 A | * | 10/1995 | Kaya et al. | ................. | 345/501 |
| 5,490,216 A | * | 2/1996 | Richardson, III | ............ | 705/59 |
| 5,579,222 A | * | 11/1996 | Bains et al. | ................. | 717/167 |
| 5,625,690 A | * | 4/1997 | Michel et al. | ................. | 705/53 |
| 5,708,709 A | * | 1/1998 | Rose | ........................... | 705/59 |
| 5,790,664 A | * | 8/1998 | Coley et al. | ................. | 709/203 |
| 5,933,498 A | * | 8/1999 | Schneck et al. | .............. | 705/54 |
| 5,987,429 A | * | 11/1999 | Maritzen et al. | .............. | 705/31 |
| 6,073,124 A | * | 6/2000 | Krishnan et al. | .............. | 705/59 |
| 6,073,256 A | * | 6/2000 | Sesma | .......................... | 714/38 |
| 6,141,698 A | * | 10/2000 | Krishnan et al. | ........... | 709/331 |
| 6,202,056 B1 | * | 3/2001 | Nuttall | ........................ | 705/52 |
| 6,216,112 B1 | * | 4/2001 | Fuller et al. | .................. | 705/14 |
| 6,330,549 B1 | * | 12/2001 | Merkle | ........................ | 705/51 |
| 2002/0077835 A1 | * | 6/2002 | Hagelin | ........................ | 705/1 |
| 2002/0120586 A1 | * | 8/2002 | Masaki et al. | ................ | 705/75 |
| 2002/0162075 A1 | * | 10/2002 | Talagala et al. | ............ | 714/819 |
| 2003/0084439 A1 | * | 5/2003 | Perkins et al. | .............. | 717/177 |

FOREIGN PATENT DOCUMENTS

| EP | 704785 A2 | * | 4/1995 |
|---|---|---|---|
| EP | WO 97/14087 | * | 4/1997 |
| EP | 778512 A2 | * | 11/1997 |

OTHER PUBLICATIONS

Narayanan Shivakumar, The SCAM Approach to Copy Detection in Digital Libraries, Nov. 1995, Department of Computer Science Stanford University, www.dlib.org/dlib/november95/scam/11shivakumar.html.*

* cited by examiner

*Primary Examiner*—James P. Trammell
*Assistant Examiner*—Kambiz A Abdi
(74) *Attorney, Agent, or Firm*—O'Melveny & Myers LLP

(57) ABSTRACT

A method and system are provided for facilitating the purchase of a license for a downloaded file of a copyrighted work. In one embodiment, a method for licensing a digital copy of a copyrighted work includes determining an identity of the digital copy by using at least one computer program, calculating a fee for a license for the digital copy by the at least one computer program. The step of calculating includes the step of measuring at least one metric of the digital copy. A license is then provided for the copy after receiving payment of the fee.

12 Claims, 3 Drawing Sheets

METHOD AND SYSTEM FOR LICENSING A COPY OF A COPYRIGHT PROTECTED WORK

CROSS-REFERENCE TO RELATED APPLICATION

This application claims priority pursuant to 35 U.S.C. § 119(e) to U.S. Provisional Application No. 60/225,886, filed Aug. 17, 2000, which application is specifically incorporated herein, in its entirety, by reference.

COPYRIGHT NOTICE

This patent document contains material subject to copyright protection. The copyright owner, Ideaflood, Inc., has no objection to the reproduction of this patent document or any related materials, as they appear in the files of the Patent and Trademark Office of the United States or any other country, but otherwise reserves all rights whatsoever.

BACKGROUND OF THE INVENTION

1. Field of the Invention

The present invention is directed to a method and system for facilitating the purchase of a copyright license for an unauthorized copy of a copyrighted work.

2. Description of Related Art

The Internet is a worldwide system of computer networks—a network of networks in which users at any one computer may get information from any other computer. The use of public and shared computing environments has proliferated due to the popularity of the Internet. And, numerous applications exist whereby music, movies, software, and other types of copyright protected works in the form of digital files may be distributed over the Internet.

In some cases, the protected works may be distributed using a centralized file sharing system, such as Napster. Napster is an application that allows users to easily search for and download their favorite music in the form of MP3 music files. Specifically, to search and download an MP3 music file, the user simply types in the name of an artist or song at the Napster.com website. The website then delivers a list of matching MP3 music files that are located on other users' computers. The user is then able to download a selected MP3 file by highlighting the particular file and clicking the "download" button. After completion of the download, the user is able to play the music on a computer or portable MP3 player. In view of the ability to download MP3 music files for free, many users opt to not purchase a copy of the music in CD or cassette tape format from an authorized retailer.

In other cases, copyrighted works may be distributed using a decentralized file sharing system, such as Gnutella. Gnutella makes it possible to search and download almost any type of copyrighted work that is in the form of digital files from any other Gnutella user. Gnutella does this without the need to use a central website like Napster. Note that Gnutella users can search for and exchange any type of digital file, not just MP3 music files as with Napster. Whichever system is used, the Internet allows consumers to share and download copyrighted works for free, and almost without technological limits.

The distribution system described above provides many advantages and disadvantages for consumers and copyright owners. The advantages include distribution of copyrighted works to a vast audience at no cost or relatively little cost to the copyright owner. The copyrighted works may also be distributed quicker than through traditional channels. Further, the works may be made available in different formats, and the system may allow consumers to sample the work before committing to purchase the work.

However, the above distribution system is economically harmful to copyright owners since the copyrighted works are being distributed for free so that copyright owners suffer loss of revenues. Consumers are also hurt because the downloading of copyrighted works is illegal and immoral so that consumers suffer from a guilty conscience and the possibility of criminal and civil sanctions.

In order to eliminate the disadvantages of the above-described distribution system, some have proposed to increase enforcement of the copyright laws. Today's enforcement activities are mostly directed to shutting down website operators that contribute to copyright infringement by consumers. If a centralized file sharing system such as Napster is shut down, then consumers are prevented from making illegal downloads. With the advent of decentralized distribution systems such as Gnutella, however, there are no website operators to shut down so that consumers are not prevented from making illegal downloads. To effectively deter illegal downloading, consumers themselves must be prosecuted; but to track, investigate, and prosecute each individual case of illegal downloading on a network such as the Internet is not feasible.

Thus, it would be desirable to provide a method and system that realizes the advantages of a costless distribution system, and which also promotes compliance with the copyright laws.

SUMMARY OF THE INVENTION

In accordance with the teachings of the present invention, a method and system are provided for facilitating the purchase of a license for a downloaded file of a copyrighted work. In one embodiment, a method for licensing a digital copy of a copyrighted work includes determining an identity of the digital copy by using at least one computer program, and calculating a fee for a license for the digital copy by the at least one computer program. The step of calculating includes the step of measuring at least one metric of the digital copy. A license is then provided for the copy after receiving payment of the fee.

In another embodiment of the present invention, a computer program is used for licensing a digital copy of a copyrighted work, with the at least one computer program being executable by a processor. The program includes the steps of determining an identity of the digital copy, and calculating a price of a license for the digital copy. The calculating step includes the step of measuring at least one metric of the digital copy. A license is then provided for the copy after receiving payment of the fee.

In another embodiment of the invention, a web host for licensing a digital copy of a copyrighted work includes a web server, and a storage medium accessible by the web server. The storage medium includes a database, and the database includes at least one of known checksums or other unique characteristics of copyrighted works and reference codes for identifying copyrighted works. Also included is a computer program that performs various licensing functions including identifying the digital copy and calculating a fee for a license for the digital copy based on various metrics of the digital copy.

In another embodiment of the invention, a method for licensing a digital copy of a copyrighted work includes the steps of allowing inputting of information relevant to pricing of a license for the digital copy, and calculating a fee for a license for the digital copy based on the relevant information. A license is then provided for the digital copy after receiving payment of the fee.

According to the present invention, when a consumer has downloaded a copy of a copyrighted work from the Internet, the consumer can conveniently purchase a license for the downloaded copy. The invention takes advantage of the costless distribution system already in place over the Internet to provide a valid license at reduced fees as compared to purchasing a copy of the copyrighted work through traditional distribution channels. The consumer benefits from the costless distribution system since no middleman fees are passed on to the consumer. The consumer also enjoys the ability to freely choose a distribution system, even systems so novel or secret that they are, at the time of use, unknown to the copyright holder. Further, the consumer is provided a mechanism for complying with the copyright laws so that anxiety and guilt over breaking the law and acting immorally can be assuaged.

Another element of the present invention requires that the consumer report the method by which the work was acquired so as to allow the copyright holders to track down infringers. Consumers may then be rewarded with a free upgrade or paid upgrade.

A more complete understanding of the present invention will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF PREFERRED EMBODIMENTS

The present invention facilitates the purchase of a license for an unauthorized copy of a copyrighted work so as to take advantage of the distribution system that is already in place using the Internet. Specifically, the invention allows consumers to obtain a license for an unauthorized copy of a copyrighted work that was downloaded from the Internet. Note that the unauthorized copy is a digital copy of a copyrighted work such as a computer program, music, movie, and the like.

Figure 1:
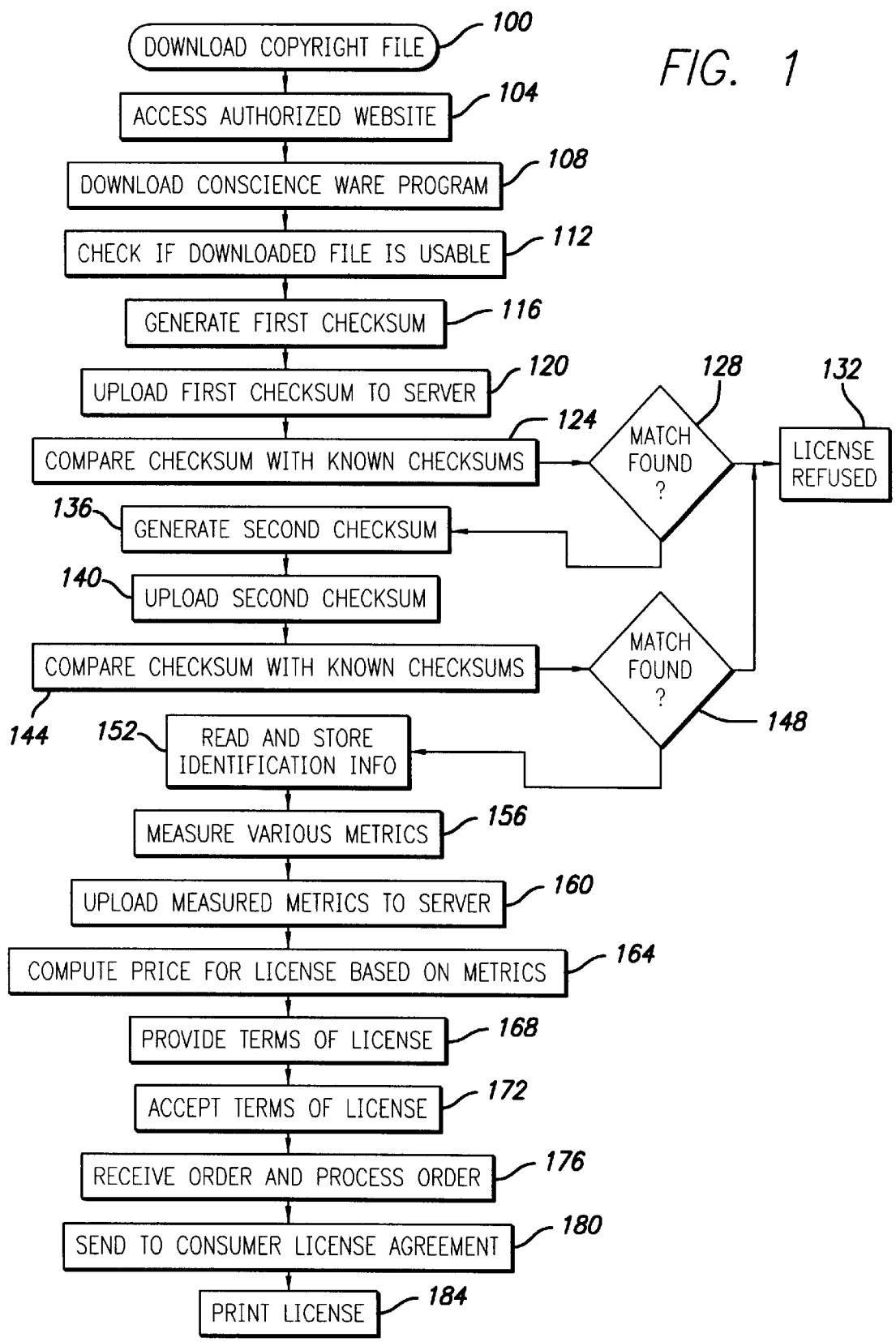
FIG. 1 is a flow chart showing the steps to purchasing a license for an unauthorized digital copy of a copyrighted work according to an embodiment of the invention.

FIG. 1 is a flow chart showing the steps to purchasing a license for an unauthorized digital copy of a copyrighted work according to an embodiment of the invention. At step 100, a consumer downloads a digital copy of a copyrighted work. The consumer may download a digital copy of a copyrighted work in any desired manner. For example, the consumer may use an application such as Napster or Gnutella to download the digital file onto his computer.

After downloading the digital copy, the consumer wants to purchase a license for the downloaded file. The consumer has many good reasons for purchasing a copyright license. The consumer may be a law-abiding citizen and wish to comply with the copyright laws. The consumer may be a religious person and may wish to remain a morally upright person. Additionally, after purchasing a license, the consumer can register his downloaded digital file with the copyright owner, and receive customer support. For example, if the consumer has downloaded a copy of a computer program, then the consumer can obtain a license and register with the copyright owner of the computer program via the Internet or by phone. Thereafter, the consumer is able to obtain customer support when using the computer program. Similarly, a consumer who licenses a poorly digitized MP3 file may be offered the option (for free or otherwise) of downloading a higher quality version.

Figure 2:
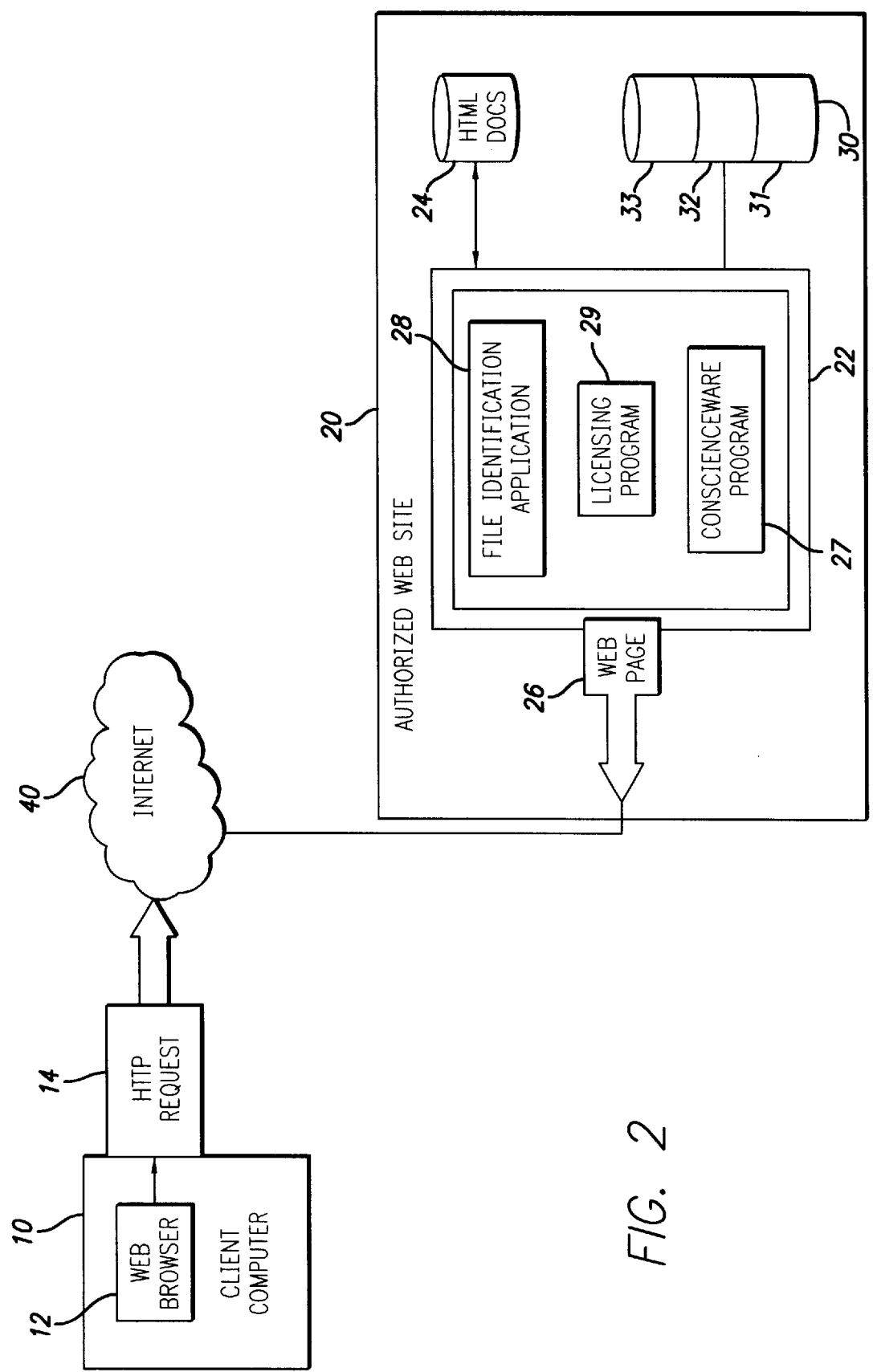
FIG. 2 is a block diagram of a wide area network for downloading the conscienceware program and for purchasing a license according to an embodiment of the invention.

Since many consumers do not know certain characteristics of a file that they are downloading, which are important for receiving a fair price when purchasing a copyright license, a computer program ("conscienceware program") is provided that facilitates the transaction. FIG. 2 is a block diagram of a wide area network for downloading the conscienceware program and for purchasing a license according to an embodiment of the invention. FIG. 2 depicts a client computer 10, connected via a communications network such as the Internet 40, to a web server 22 of the authorized website 20. Note that there may be many other computers 10 that may be connected to the web server 22 at the same time. Also, multiple servers 22 may service multiple client computers 10. Alternatively, the conscienceware program could also be distributed via publication on Gnutella, or even via inclusion in a data partition of a music CD or a DVD.

To interactively browse the authorized website 20, the client computer 10 runs a web browser application 12 (e.g., Microsoft Internet Explorer™ or Netscape Communicator™). The authorized website 20 includes the web server 22 that sends web pages 26 in the form of HyperText Markup Language (HTML) documents, which may be stored in database 24, to the client computer 10 using the HyperText Transfer Protocol (HTTP). The server 22 includes a processor to execute the web server software, and an operating system program and applications programs including the conscienceware program 27, a file identification application 28 and a licensing program 29. The server 22 also has a memory 30 including databases 31–32 that stores data files for comparison by the file identification application 28, and a cache memory 33. The file identification application 28 and licensing program 29 may be executing on the server 22, or may be executing on a separate computer. In the present invention, the file identification application 28 compares the files stored in databases 31–32 with the file attribute information that is sent by the client 19 running the conscienceware program 27, as described below.

In order to download the conscienceware program 27, at step 104 the consumer accesses the authorized website by communicating an HTTP request from the web browser 12. The HTTP request includes the Uniform Resource Locator (URL) of the home page of the authorized website. The HTTP request is routed to the web server 22 via the Internet 40. The web server 22 retrieves the home page identified by the URL, and transmits the home page over the Internet 40 to the web browser 12. The HTML document may be sent in the form of plural message packets as defined by the Transport Control Protocol/Internet Protocol (TCP/IP).

At the home page, a hypertext link is provided that links to a download page of the conscienceware program 28. By clicking on the highlighted link, the download page is retrieved by the server 22 and sent to the web browser 12.

At the download page, the consumer chooses among various platforms in order to download a compatible version of the conscienceware program for the particular client platform. For example, if the client computer 10 is operating on the Windows™ operating system, then he selects the Windows platform. It can also be coded in a platform-independent language such as Java.

After the choosing the appropriate platform, at step 108 the consumer downloads the conscienceware program to his computer by clicking on the download button. After downloading and installing the conscienceware program, at step 112 the conscienceware program checks to see if the downloaded file is a usable copy. For example, when the user selects the downloaded file for the conscienceware program to check at step 112, the conscienceware program checks to see if there is a valid serial number associated with the downloaded digital file or that the encryption has been removed. If the downloaded file is a copy of a software program, then the program may not be usable without a valid serial number (e.g., Microsoft Windows 98™). Similarly, a downloaded digital file of a movie "ripped" from a DVD is checked by the conscienceware program to make sure that the encryption has been removed.

Next, the identity of the downloaded file needs to be determined. The identity of the downloaded file may be made using the method disclosed in copending U.S. patent application Ser. No. 09/561,751, which is incorporated herein by reference. Any other suitable verification technology may also be used, such as pattern matching or digital watermarking. In addition, when the conscienceware database is unable to identify a work, the work can be manually reviewed and added to the database. In order for the conscienceware program to identify the downloaded file, a connection may need to be maintained by the client computer 10 with the authorized website 20. Alternatively, the client 10 and the server 22 may maintain a stateless connection such that only when the client 10 needs to send identification information to the server 22 and download a license is the client connected to the server.

In one embodiment, the conscienceware program samples a portion of the downloaded file and generates a "checksum" of the file, which is a unique number based on a range or ranges of bytes in a file. Unlike checksums as they are traditionally used in the computing field, the checksum described herein is not related to the total number of bytes used to generate the number, thus reducing a traditional problem with checksums, namely that similar file lengths are more likely to generate the same checksum than are dissimilar file lengths.

In a preferred embodiment of the invention, two separate checksums are generated for a file corresponding to two different length portions of the file. While it is possible that the first checksum based on a shorter length portion of the file may falsely match the checksum of another file, it is highly unlikely that the second checksum would result in a false match. In addition, the use of an initial checksum based upon a small amount of data reduces the burden on the network and file server. This reduction is a result of the ability to disqualify a file that does not match the first checksum without the need to read the larger amount of data necessary to generate the second checksum. Specifically, the conscienceware program reads a first portion of the downloaded file, which may be the first one thousand (1024) bytes of the file, and at step 116 generates a first checksum. At step 120, the first checksum is uploaded to the server 22. The file identification application 29 at step 124 compares the first checksum with a library of known checksum values that are stored in database 31. This step provides an initial identification of the downloaded file.

If there is not a match based on the initial screen of the file at step 128, then at step 132 a license is refused by the authorized website. If there is a match at step 128, then the conscienceware program reads a second portion of the downloaded file, which may be the first ten thousand (10240) bytes of the file, and generates a second checksum at step 136. At step 140, the second checksum is then uploaded to the server 22, and at step 144 is compared to the library of known checksum values for a match in database 31. This step provides a more conclusive determination of the identity of the downloaded file. If there is not a match at step 148, then at step 132 a license is refused by the authorized website. If there is a match at step 148, then at step 152 the file identification program 28 reads the identification information of the known checksums and stores it in the cache memory 33. Note that identification information may also include the particular version of the copyrighted work that was downloaded.

As described above, the first one thousand bytes and the first ten thousand bytes are used for the two checksums, respectively. For most applications, the use of the entire file or a larger portion of the file is not necessary and indeed may slow the process; however, there is no reason why the entire file or any other subset of the file could not be used. In an alternative embodiment, the first and last portions of the file are used for generating the checksums, although premature file truncation then becomes a way to defeat the screen. It is also possible to use other data to improve the quality of the initial screen, such as the length of the file and the file name. Any file matching the initial screen criteria is then checked against one or more checksum tests. Yet another alternative embodiment is to simultaneously generate both the initial screen checksum and the confirmation checksum in a single file read, thereby reducing the number of distinct disk access events. Verification is optional when the initial screen is performed using a checksum, as the checksum denotes a nearly certain match.

In an alternative embodiment of the invention, a downloaded file includes certain identifying data that permits unique identification of that file. For example, MP3 encoders can be configured to encode this information into the first bytes of each MP3 file. As such, the MP3 file would carry the signature of the music CD that it was created from. This would permit the conscienceware program to scan the downloaded file for the signature code of a particular CD. When such a code is found, the code can be uploaded to the server 22 so that it can be checked against a database 32 of known reference codes, with the identity of the work being stored in cache memory 33. Further, the downloaded file may include a version number that is embedded in the file. The conscienceware program would then be able to read the version number and upload it to the server 22 for storage in the cache memory 33.

At step 156, the conscienceware program measures various metrics of the downloaded file in order to determine a fair price for a license. For example, for a downloaded digital copy of a copyrighted song that is in the MP3 format, the conscienceware application determines a sampling rate for the MP3 music file. After determining the sampling rate, at step 160 this information is uploaded to the server 22 for storage in cache memory 33. Other metrics that may be measured and uploaded to the server may include the length in bytes of the file, the version of the file, the type of work downloaded, and the like.

After all of the relevant information is stored in the cache memory 33, such as the identity of the downloaded file, the sampling rate, the version, the type of work, and the like, at step 164 the licensing program 29 running on the server 22 computes a price for a license for the downloaded file. Specifically, the licensing program 29 computes a price based on the measured metrics. For example, if the downloaded file is the most recent version of a copyrighted work, then the price would be higher than for an earlier version. The type of work would also be considered in determining a fair price for the work so that if the downloaded file is a DVD movie file, then a license for this type of work may be higher than for a song. Additionally, the length of the digital file would be considered in computing a fair price. Further, the sampling rate of the compressed has a sampling rate that is below 32 kbps, then it may be licensed for free. If the MP3 music file has a sampling rate above 32 kbps but below 64 kbps, then it may be licensed for $0.50, and so on. Other defects in the copy, such as background hiss indicating that the data has once been stored in analog (i.e., cassette tape or the like), or encoding defects such as pops may also influence the price calculation. Thus, the licensing program 29 is able to calculate a price for a license based on the measured metrics.

Optionally, the licensing program 29 may offer a discount to the consumer, or simply refuse a license to the consumer, unless the consumer discloses the source from which they downloaded the digital copy. The licensing program 29 would then verify that the copyrighted work is available at the source. This would provide the additional benefit to the copyright owner of discovering the identity of the entity that is pirating copyrighted works.

At step 168, the consumer is provided the terms for the license including the price and conditions of use. If the terms are satisfactory for the consumer, then at step 172 the consumer accepts the terms of the license and provides payment for the license, preferably via a credit card. At step 176, the server receives the order, and processes the order by verifying the credit card payment. After verification of the payment method, at step 180 the server 22 sends to the client computer 10 a digital file containing a license as proof that the consumer has obtained a valid license for the downloaded file. After receipt of the file, at step 184 the consumer prints the license on his printer. Additionally or alternatively, the license may be centrally stored in the conscienceware database under the consumer's name and password.

Figure 3:
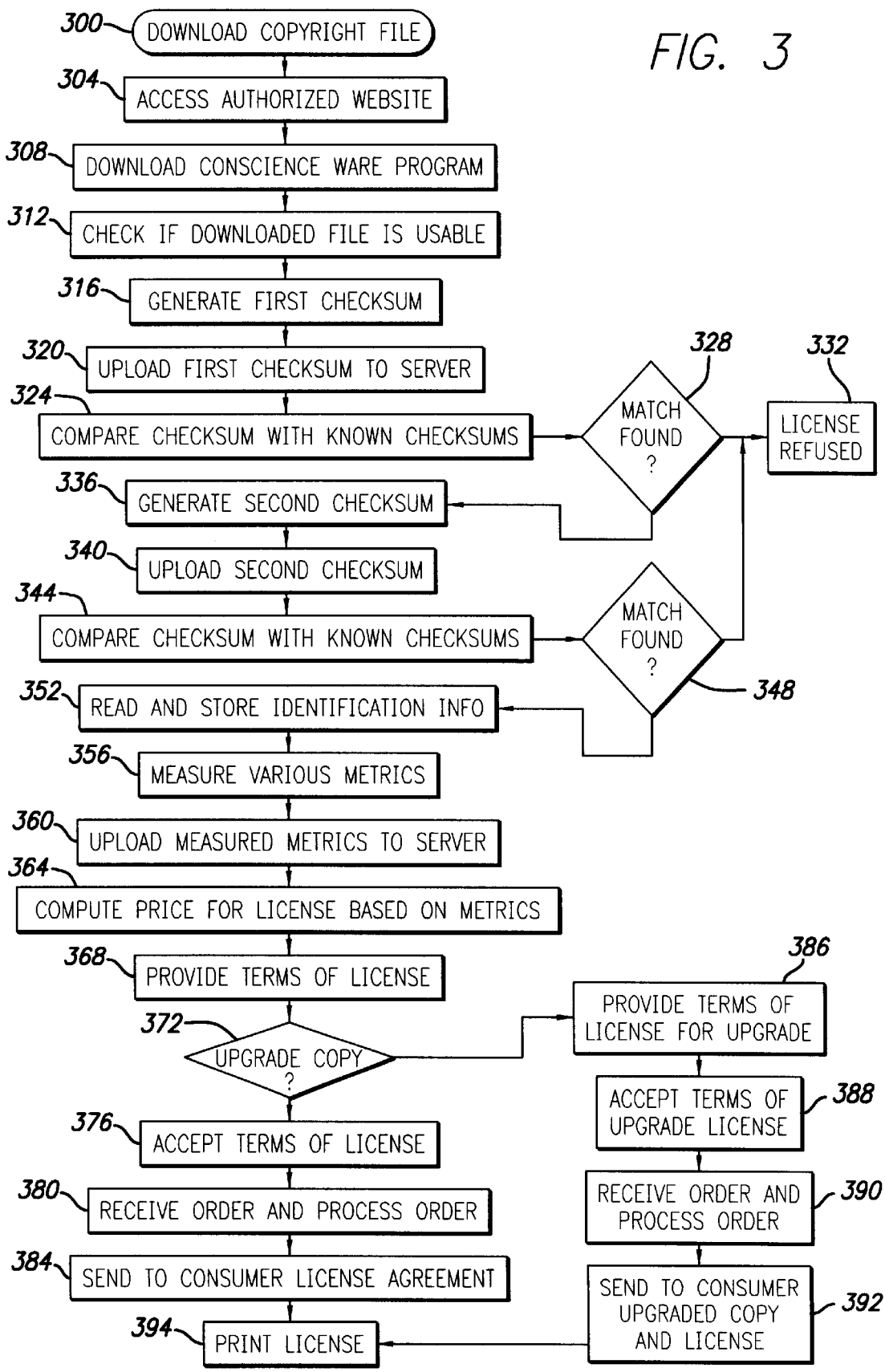
FIG. 3 is a flow chart showing the steps to upgrading an already downloaded copy according to an embodiment of the invention.

In another embodiment of the invention, the consumer may be provided an option to upgrade the copy of the copyrighted work that was downloaded with a more recent version or a better quality copy from the authorized website 20. FIG. 3 shows the steps for upgrading the downloaded file according to an embodiment of the invention. Steps 300–368 are the same as step 100–168 of FIG. 1.

If the consumer has the best copy available of the copyrighted work or does not want to upgrade at step 372, then at step 376 the consumer can decline to upgrade by accepting the terms of the license for the already downloaded file and paying the license fee. Steps 376–384, 394 are the same as steps 176–184 of FIG. 1. If the consumer does not have the best copy available and wants to upgrade at step 372, then at step 386 the authorized website provides to the consumer the terms including price and conditions of use for the upgraded copy. For example, a consumer who is seeking a license for Windows 98™ may be offered the opportunity to download and upgrade to Windows 2000™. Or, a consumer who has downloaded a MP3 music file having a 64 kbps sampling rate may be able to upgrade to a CD-quality 148 kbps-sampling rate MP3 music file. For software that requires a valid serial number to run, the consumer may optionally be given a unique, new serial number in exchange for the pirated one they had been using. Indeed, such a switch may be required and the pirated serial number disabled in the next version of the software.

If the terms are acceptable to the consumer, then at step 388 the consumer accepts the terms of the license for the upgrade and provides payment for the license. At step 390, the server receives the acceptance by the consumer and verifies the payment method. After verification of the payment method, at step 392 the server sends to the client computer the upgraded copy of the copyrighted work and a license for the copy. After receipt of the copy and license, at step 394 the consumer prints the license on his computer.

Although in the embodiments described above, the conscienceware program is downloaded onto a client computer, in alternative embodiments, the program could be embedded in a web page that is sent to the client 10. Also, for a single file, such as a MP3 file, the file can be dropped onto a web page that allows uploading of the MP3 file so that conscienceware program running on the server operates on the file directly.

Alternatively, if the consumer already has information that is relevant to the pricing, the conscienceware program does not need to identify and measure the various metrics of the downloaded file. In this instance, the consumer accesses the authorized website and inputs the required information and purchases a license for the downloaded file.

In the method and system of the present invention, there are no added costs that must be passed on to the consumer for the distribution of copyrighted works. Since a consumer initially obtained a copyrighted file for free, there are no associated distribution costs that must be passed on to the consumer. Further, the invention allows consumers to easily obtain a license so that they do not have to feel anxiety and guilt for the illegal downloading of protected works.

Having thus described a preferred embodiment of a method and system of licensing of copyrighted works, it should be apparent to those skilled in the art that certain advantages have been achieved. It should also be appreciated that various modifications, adaptations, and alternative embodiments thereof may be made therein within the scope and spirit of the present invention. The invention is further defined by the following claims.

What is claimed is:

1. At least one computer program embedded on a computer readable medium and used for licensing a digital copy of a copyrighted work distributed to a consumer via a first distribution system, said at least one computer program executable by a processor, said program including the steps of:

determining an identity of said digital copy;

calculating a price of a license for said digital copy, said step of calculating including the step of measuring at least one metric of said digital copy for calculating said price, said at least one metric being a detectable characteristic of said digital copy; and providing a license for said copy after receiving payment of said price from a consumer;

wherein said at least one computer program is distributed from a second distribution system that is different and unrelated to said first distribution system; and wherein said step of determining an identity includes the steps of:

generating a first checksum of a first portion of said digital copy;

comparing said first checksum with a library of known checksums for a first match in order to ascertain the identity of said digital copy;

generating a second checksum of a second portion of said digital copy; and comparing said second checksum with said library of known checksums for a second match in order to further ascertain the identity of said digital copy, said library of known checksums being stored in a database that is electronically accessible to said processor;

wherein said first portion is based on a shorter portion of said digital copy than said second portion.

2. The program of claim 1, including the step of verifying that said digital copy is a usable copy.

3. The program of claim 2, wherein said digital copy is a usable copy if said digital copy includes a valid serial number.

4. The program of claim 2, wherein said digital copy is a usable copy if said digital copy is not encrypted.

5. The program of claim 1, wherein said step of measuring includes the step of identifying a version of said digital copy with respect to available versions of said copyrighted work.

6. The program of claim 1, wherein said step of measuring includes the step of determining a length of said digital copy.

7. The program of claim 1, wherein said step of measuring includes the step determining a sampling rate of said digital copy.

8. The program of claim 1, wherein said step of measuring includes the step determining a type of work of said digital copy.

9. The program of claim 1, wherein said step of determining an identity includes the steps of:

scanning said digital copy for an identifying code; and comparing said code with known reference codes for a match in order to ascertain the identity of said digital copy.

10. The program of claim 1, further comprising the step of allowing said consumer to upgrade said digital copy to a second digital copy including at least one of a newer version, a better quality copy, a valid serial number, and a higher sampling rate.

11. A web host for licensing a digital copy of a copyrighted work distributed to a consumer from a decentralized distribution system, comprising:

at least one web server;

a storage medium accessible by said at least one web server, said storage medium including at least one database, said at least one database including a plurality of known checksums of copyrighted works and a plurality of reference codes for identifying copyrighted works; and at least one computer program operable with said at least one web server performing various functions including identifying said digital copy from said decentralized distribution system and calculating a fee for a license for said digital copy based on various metrics of said digital copy, said metrics being detectable characteristics of said digital copy;

wherein said identifying function of said digital copy includes comparing first and second checksums of said digital copy to said known checksums of copyrighted works for a first match and a second match and wherein said first and second checksums are generated using two different length portions of said digital copy.

12. The web host of claim 11, wherein said calculating function of said fee for said license includes determining at least one of a version, a length, a sampling rate and a type of work of said digital copy.

* * * * *